(12) United States Patent
Huang

(10) Patent No.: US 11,700,933 B2
(45) Date of Patent: Jul. 18, 2023

(54) INTERDENTAL BRUSH

(71) Applicant: CLEANER JACK CO., LTD., Pingtung (TW)

(72) Inventor: Chuan-Yuan Huang, Pingtung (TW)

(73) Assignee: CLEANER JACK CO., LTD., Pingtung (TW)

( * ) Notice: Subject to any disclaimer, the term of this patent is extended or adjusted under 35 U.S.C. 154(b) by 1048 days.

(21) Appl. No.: 16/399,526

(22) Filed: Apr. 30, 2019

(65) Prior Publication Data

US 2020/0345126 A1 Nov. 5, 2020

(51) Int. Cl.
| | | |
|---|---|---|
| *A61C 15/00* | (2006.01) | |
| *A46B 5/00* | (2006.01) | |
| *A46B 9/00* | (2006.01) | |
| *A61C 15/04* | (2006.01) | |
| *A46B 9/02* | (2006.01) | |
| *A46B 15/00* | (2006.01) | |

(52) U.S. Cl.
CPC ............ *A46B 5/0037* (2013.01); *A46B 9/005* (2013.01); *A46B 9/028* (2013.01); *A46B 15/0073* (2013.01); *A61C 15/046* (2013.01); *A46B 2200/108* (2013.01)

(58) Field of Classification Search
CPC ......... A61C 15/00; A61C 15/02; A61C 15/04; A61C 15/046; A46B 9/005; A46B 9/028; A46B 9/04; A46B 9/045; A46B 9/06; A46D 1/02

USPC ........................................................ 15/207.2
See application file for complete search history.

(56) References Cited

U.S. PATENT DOCUMENTS

| | | | |
|---|---|---|---|
| 8,251,074 B2 * | 8/2012 | Pires ...................... | A46B 9/005 |
| | | | 132/218 |
| D927,193 S  * | 8/2021 | Mizuno ......................... | D4/104 |
| 2008/0149134 A1 * | 6/2008 | Crossman ............. | A61C 15/046 |
| | | | 132/324 |
| 2011/0067725 A1 * | 3/2011 | Manici .................... | A46B 9/021 |
| | | | 132/218 |
| 2020/0260853 A1 * | 8/2020 | Zwimpfer .......... | A46B 15/0016 |

* cited by examiner

*Primary Examiner* — Rachel R Steitz
(74) *Attorney, Agent, or Firm* — Muncy, Geissler, Olds & Lowe, P.C.

(57) ABSTRACT

An interdental brush comprising an interdental brush bar and a grip, the interdental brush bar having a central shaft and a joint portion, the central shaft surface axially staggering a plurality of first bristle sets and a plurality of second bristle sets, the first bristle set has two first bristles, and the second bristle set has two second bristles, and each of the first bristles is connected with an adjacent second bristles to form a squeegee. The grip connects the joint portion, and the squeegee can increase the contact area with the teeth to enhance the cleaning effect.

12 Claims, 6 Drawing Sheets

INTERDENTAL BRUSH

BACKGROUND OF THE INVENTION

Field of the Invention

The present invention relates to a dental brush, and more particularly to an interdental brush.

Description of the Related Art

The conventional interdental brush can be roughly divided into two types: a fine brush type and a soft type. The fine brush type interdental brush is relatively thinner and softer, and therefore has a poor cleaning ability.

Another type of fine brush-type interdental brush uses metal as the bristles, which will bleed and damage the gums with a little force.

Soft bristles are generally made of silicone or rubber bristles, and have a larger contact area than fine bristles, as shown in U.S. Pat. No. 6,018,263,741 A1, which is incorporated herein by reference. The prior art patent disclosed an interdental brush, having the base and the cleaning member, wherein the base is provided with a shaft portion and a handle portion, and the cleaning member is provided with a plurality of tapered bristles radially on the surface of the shaft portion.

The prior art disclosed in the above patents cleans between the teeth by a plurality of tapered bristles, each of which is pushed and bent as it passes over the surface of the tooth, and the tapered bristles are passed through the surface of the tooth. There is only one linear contact between the teeth, the contact area is too small, the cleaning effect is poor, and each of the tapered bristles stands independently without support, and the strength is insufficient.

BRIEF SUMMARY OF THE INVENTION

An object of the present invention is to provide an interdental brush which can enhance the cleaning effect.

Another object of the present invention is to provide an interdental brush having a two-in-one effect in which the interdental brush is combined with the dental floss.

A further object of the present invention is to provide an interdental brush that does not harm the gums.

In order to achieve the foregoing and other objects, in an embodiment, the interdental brush of the present invention comprises an interdental brush bar having a central shaft and a joint portion, the surface of the central shaft being axially staggered with a plurality of first bristle set and a plurality of second bristle set, the first bristle set having two first bristles, the second bristle set having two second bristles, a squeegee connected and supported between each the first bristles and adjacent the second bristles; and a handle coupled to the joint portion.

In an embodiment, the first bristle set and the second bristle set are disposed perpendicular to each other.

In an embodiment, the length of the squeegee connected to the first bristles is 40 to 60% of the height of the first bristles.

In an embodiment, the handle has a handle extension shaft, and the central shaft covers the handle extension shaft.

In an embodiment, the handle is made of a plastic material, and the interdental brush bar is covered with a silicone or rubber material to cover the handle extension shaft.

In an embodiment, the joint portion is semi-spherical.

In an embodiment, the width of the first bristle set and the second bristle set is tapered from one end of the joint portion toward the other end.

In an embodiment, the maximum width of the first bristle set and the second bristle set is tapered from 3 mm to a minimum width of 2 mm.

In an embodiment, the adjacent bristle sets spacing is 1 mm. In particular, the spacing between adjacent first bristle sets and the spacing of adjacent second bristle sets are 1 mm.

In one embodiment, the handle is coupled to a dental floss stick.

In one embodiment, the dental floss stick includes a first support bar, a second support bar, and a floss coupled between the first support bar and the second support bar.

In one embodiment, the handle extends from the first support bar of the dental floss stick, and the handle and the dental floss stick are of the same material.

In one embodiment, the squeegee is oppositely arranged on opposite sides of the central shaft.

DETAILED DESCRIPTION OF THE INVENTION

Figure 1:
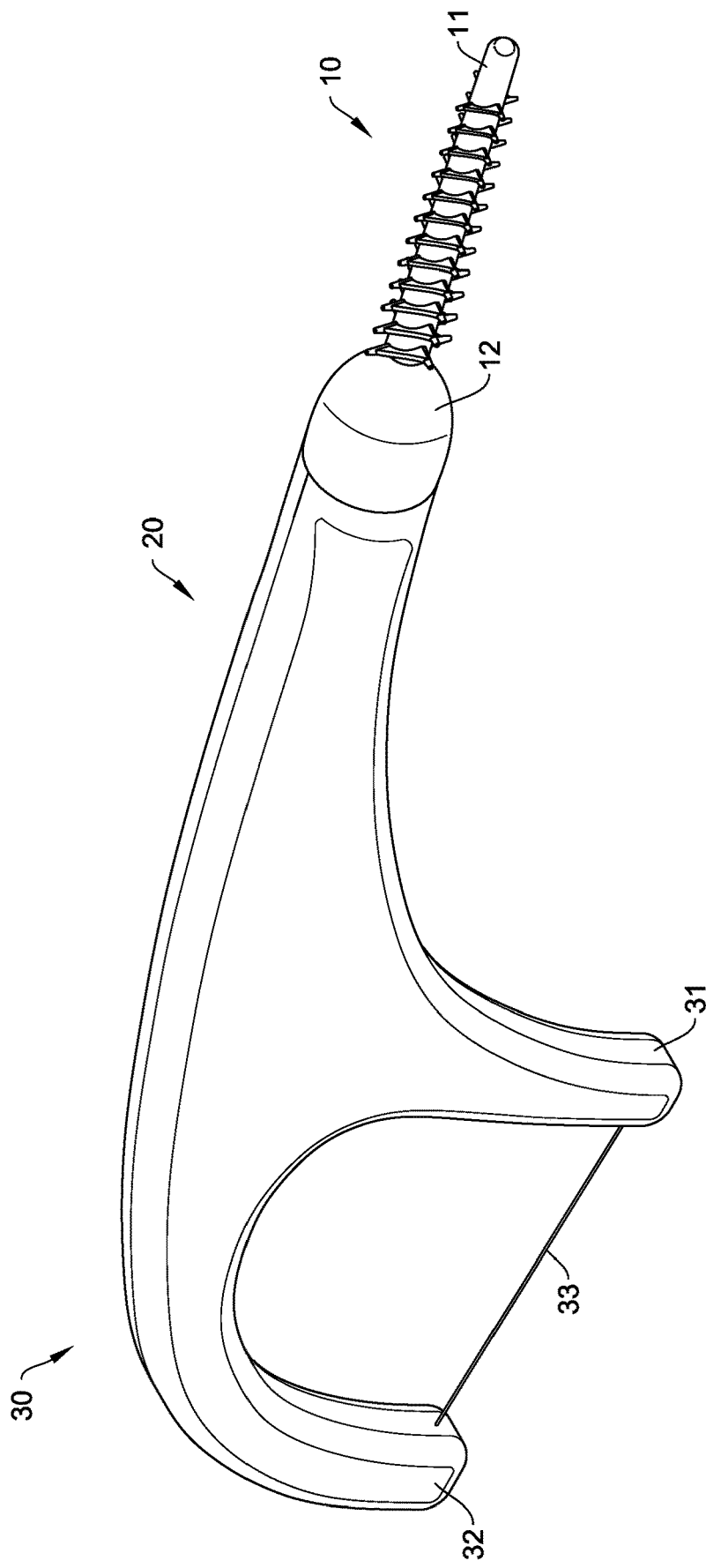
FIG. 1 is a perspective view of an interdental brush according to an embodiment of the present invention.
Figure 2:
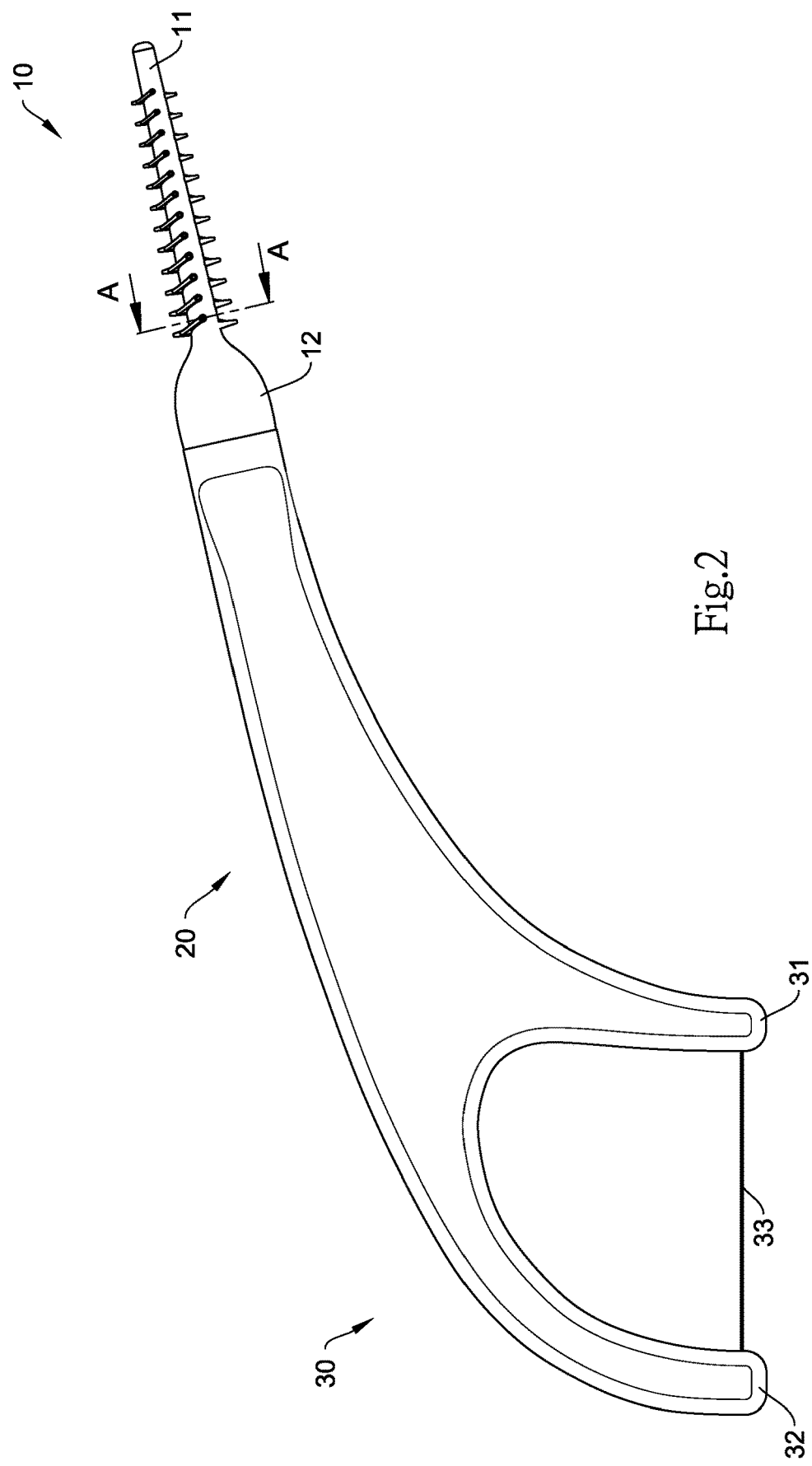
FIG. 2 is a side elevational view of an interdental brush in accordance with an embodiment of the present invention.
Figure 3:
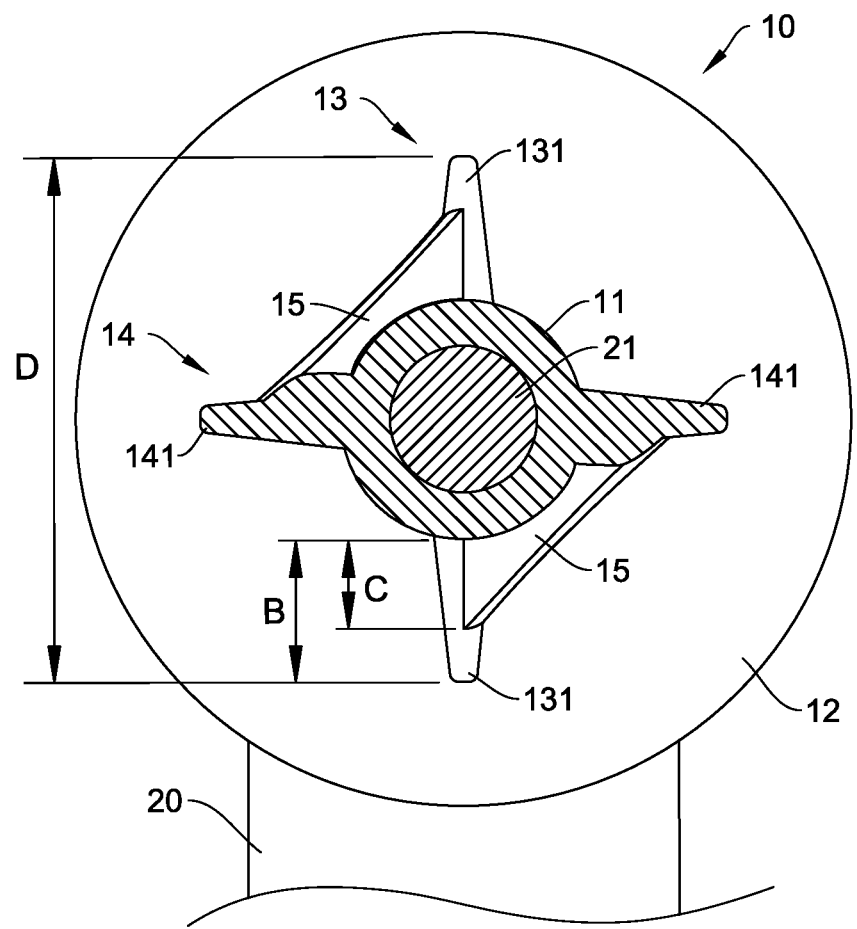
FIG. 3 is a cross-sectional view taken along line A-A of FIG. 2 of the interdental brush of the embodiment of the present invention.
Figure 4:
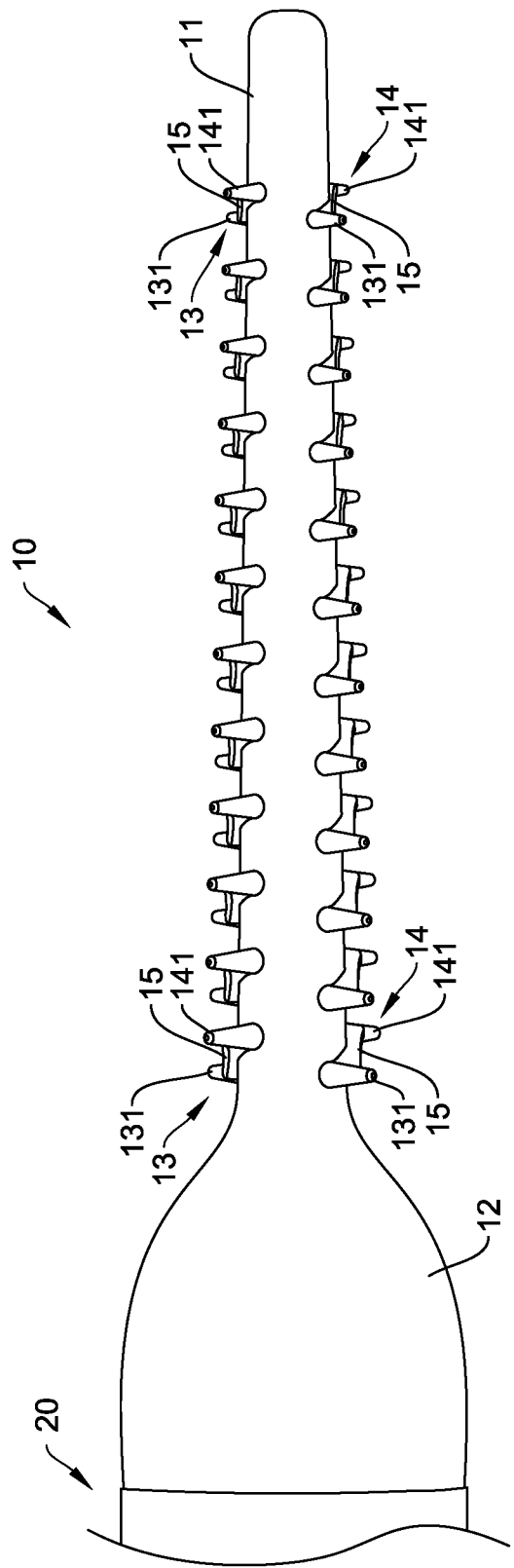
FIG. 4 is a partial enlarged view of the interdental brush bar of the interdental brush of the embodiment of the present invention.
Figure 5:
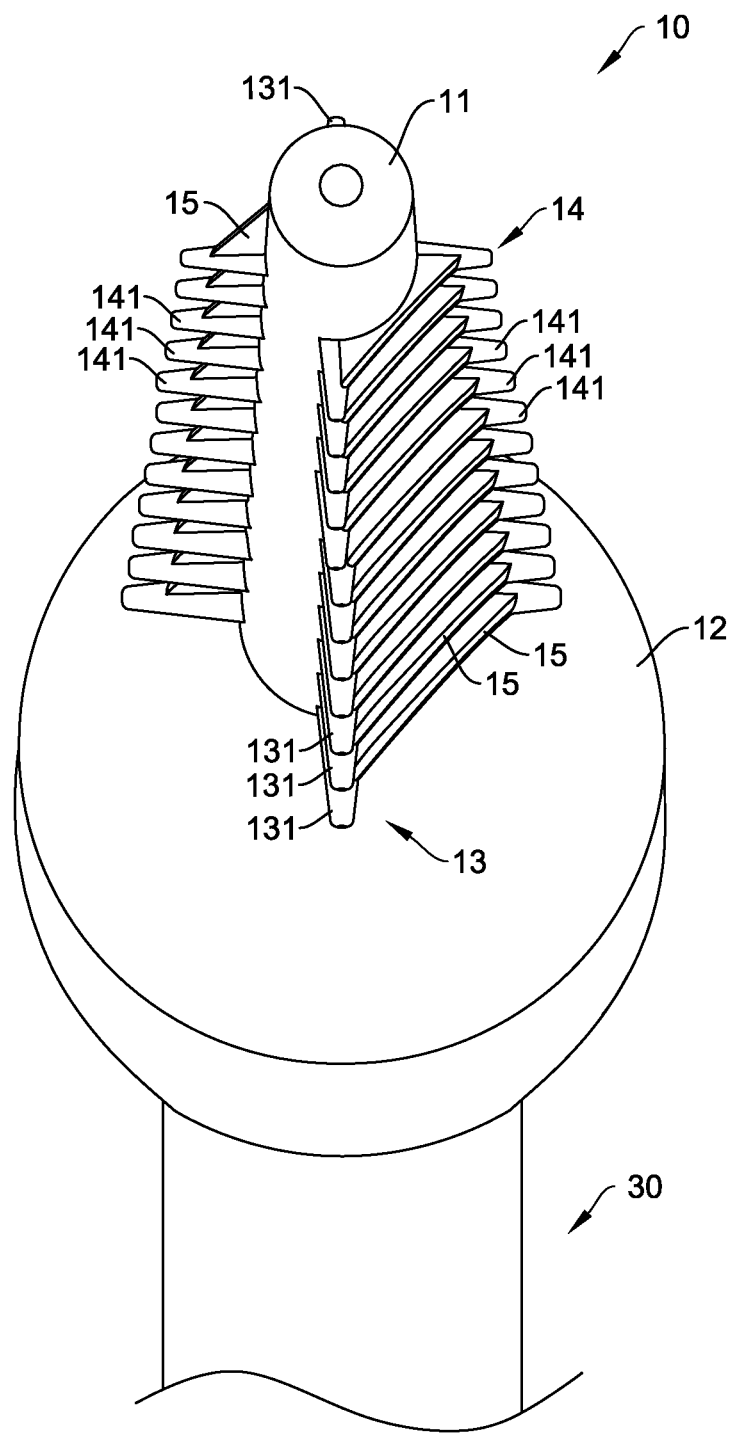
FIG. 5 is a partially enlarged perspective view showing the interdental brush of the embodiment of the present invention.
Figure 6:
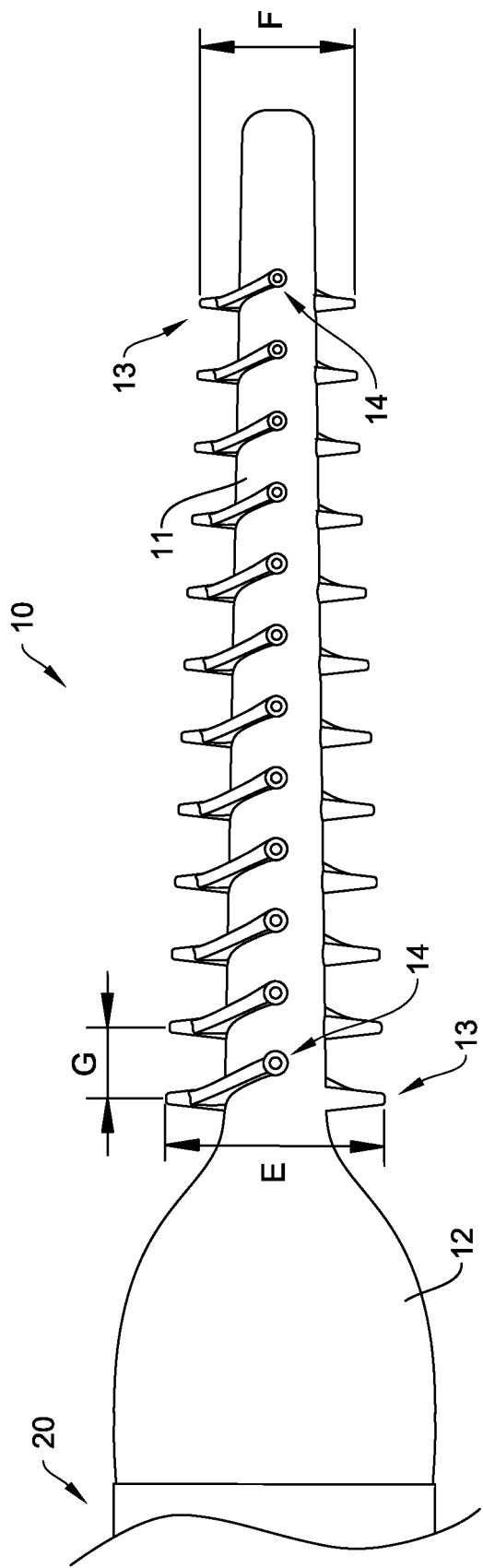
FIG. 6 is a partial enlarged view of the interdental brush bar of FIG. 2 of the interdental brush of the embodiment of the present invention.

FIG. 1 is a perspective view of an interdental brush according to an embodiment of the present invention, FIG. 2 is a side view of the interdental brush according to an embodiment of the present invention, and FIG. 3 is a cross-sectional view taken along line AA of FIG. 2 of the interdental brush of the embodiment of the present invention, FIG. 4 is a partial enlarged view of the interdental brush bar of the interdental brush according to the embodiment of the present invention, FIG. 5 is a partially enlarged perspective view showing the interdental brush of the embodiment of the present invention. FIG. 6 is a partial enlarged view of the interdental brush bar of FIG. 2 of the interdental brush of the embodiment of the present invention. FIGS. 1 to 6, the present invention can be clearly understood from different angles and cross-sectional views. The interdental brush of a preferred embodiment of the present invention comprises at least an interdental brush bar (10) and a handle (20). The interdental brush bar (10) has a central shaft (11) and a joint portion (12). The surface of the central shaft (11) is axially staggered with a plurality of first bristle set (13) and a plurality of second bristle set (14). The first bristle set (13) has two first bristles (131), and the second bristle set (14) has two second bristles (141). A squeegee (15) is formed, connected and supported between each the first bristles (131) and adjacent the second bristles (141).

The handle (20) is connected to the joint portion (12), and the handle (20) is grasped by fingers, so that the interdental brush can be conveniently used. The handle (20) is preferably formed in a flat shape for easy pinching.

By the arrangement of the squeegee (15), the squeegee (15) can be in contact with the teeth to increase the clean area to enhance the cleaning effect.

By the arrangement of the squeegee (15), the squeegee (15) can assist in supporting the first bristles (131) and the second bristles (141), so that the first bristles (131) and the second bristles (141) are more straight, and it is not easy to be overwhelmed, and it can increase the friction with the teeth to improve the cleaning effect.

Preferably, the joint portion (12) is semi-spherical, so that the joint portion (12) does not hurt the gums when it hits the gums.

Preferably, the handle (20) can also be connected to a dental floss stick (30), and the interdental brush combined with the dental floss stick (30) has a two-in-one effect.

The dental floss stick (30) includes a first support bar (31), a second support bar (32), and a floss (33) coupled between the first support bar (31) and the second support bar (32).

The handle (20) extends from the first support bar (31) of the dental floss stick (30), and the handle (20) and the dental floss stick (30) are of the same material.

Referring to FIG. 3, preferably, the handle (20) may be provided with a handle extension shaft (21), and the central shaft (11) covers the handle extension shaft (21), such that the interdental brush bar (10) has better rigidity. The handle extension shaft (21) and the handle (20) are integrally molded and formed of the same material, preferably polystyrene, polyethylene, etc. The interdental brush bar (10) is preferably made of silicone or TPE (Thermoplastic Elastomer) or TPR (Thermoplastic rubber), which is a softer material than plastic.

Preferably, the handle (20) is made of plastic material, and the interdental brush bar (10) is made with a rubber or rubber material to cover the handle extension shaft (21), so that the interdental brush bar (10) has a soft surface and also has better rigidity.

As shown in FIG. 3, the first bristle set (13) and the second bristle set (14) are preferably disposed perpendicular to each other, so that the squeegee (15) can be oppositely arranged on opposite sides of the central shaft (11). When using the interdental brush, the teeth on both sides of the interdental can be cleaned at the same time.

Preferably, the connection length (C) of the squeegee (15) and the first bristles (131) is 40 to 60% of the first bristles height (B). Whereby the squeegee (15) can be accessed the tooth surface, to enhance the scraping ability. Whereby the ends of the first bristles (131) and the second bristles (141) protrude from the squeegee (15), and can penetrate deep into the gingival sulcus to clean the roots of the teeth.

In general, the lengths of the first bristles (131) and the second bristles (141) of the same set are the same. Therefore, it can be understood that the connection length of the squeegee (15) and the second bristles (141) is also the same as the 40~60% height of the second bristles (141).

More preferably, the widths of the first bristle set (13) and the second bristle set (14) are tapered from one end of the joint portion (12) toward the other end, thereby facilitating the interdental brush to easily penetrate tooth gap.

Referring to FIG. 3, the width (C) indicates the distance between the ends of the two first bristles (131) of the first bristle set (13) closest to the joint portion (12). Referring to FIG. 4 and FIG. 5, the widths of the first bristle set (13) and the second bristle set (14) are tapered from one end of the joint portion (12) toward the other end. Whereby the end of the interdental brush is thinner and easier to protrude into the tooth gap. The size of the tooth gap enables the first bristle set (13) and the second bristle set (14) of the appropriate length to be brushed to the teeth on both sides of the interdental seam. Moreover, the scraper (15) can scrape across the surface of the tooth, and the ends of the first bristles (131) and the second bristles (141) can be deeply cleaned deep into the gingival sulcus.

Please refer to FIG. 6. FIG. 6 is a partial enlarged view of the interdental brush bar of FIG. 2 of the interdental brush according to the embodiment of the present invention. Preferably, the maximum width (E) of the first bristle set (13) and the second bristle set (14) is reduced from 3 mm to a minimum width (F) of 2 mm, thereby being applicable to most of the teeth sew width.

Among them, the adjacent bristle sets spacing (G) is preferably 1 mm. For example, the bristle set spacing between two adjacent first bristle sets (13) is 1 mm, and the bristle set spacing between two adjacent second bristle sets (14) is also 1 mm. The setting has a good cleaning effect.

The invention claimed is:

1. An interdental brush comprising:
an interdental brush bar having a central shaft and a joint portion, a surface of the central shaft being axially staggered with a plurality of first bristle set and a plurality of second bristle set, the first bristle set having two first bristles, the second bristle set having two second bristles,
squeegees each connected and supported between each the first bristles and adjacent the second bristles, wherein the squeegees support the first bristle and the second bristle, the first bristle set and the second bristle set are disposed perpendicular to each other, and the squeegees are oppositely arranged on opposite sides of the central shaft; and
a handle coupled to the joint portion,
wherein on a horizontal cross-sectional view of the central shaft, the first bristles constitute a X-axis and the second bristles constitute a Y-axis, the squeegees are only arranged on opposite quadrants thereof, and on the horizontal cross-sectional view, the squeegees cover only about half of a circumference of the central shaft.

2. The interdental brush according to claim 1, wherein a length of the each squeegee connected to the first bristles is 40 to 60% of a height of the first bristles.

3. The interdental brush according to claim 1, wherein the handle has a handle extension shaft, and the central shaft covers the handle extension shaft.

4. The interdental brush according to claim 3, wherein the handle is made of a plastic material, and the interdental brush bar is covered with a silicone or rubber material to cover the handle extension shaft.

5. The interdental brush according to claim 4, wherein the joint portion is semi-spherical.

6. The interdental brush according to claim 1, wherein a width of the first bristle set and the second bristle set is tapered from one end of the joint portion toward an other end.

7. The interdental brush according to claim 6, wherein a maximum width of the first bristle set and the second bristle set is tapered from 3 mm to a minimum width of 2 mm.

8. The interdental brush according to claim 1, wherein a spacing between adjacent first bristle sets and a spacing of adjacent second bristle sets are 1 mm.

9. The interdental brush of claim 1, wherein the handle is coupled to a dental floss stick.

10. The interdental brush of claim 9, wherein the dental floss stick includes a first support bar, a second support bar, and a floss coupled between the first support bar and the second support bar.

11. The interdental brush of claim 10, wherein the handle extends from the first support bar of the dental floss stick, and the handle and the dental floss stick are of the same material.

12. The interdental brush of claim 1, wherein the squeegees are only arranged on a second quadrant and a forth quadrant of the horizontal cross-sectional view of the central shaft.

\* \* \* \* \*